M. CHASE.
Saws.
No. 152,970.
Patented July 14, 1874.
Fig. 1.
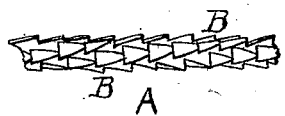
Fig. 2.
Fig. 3.
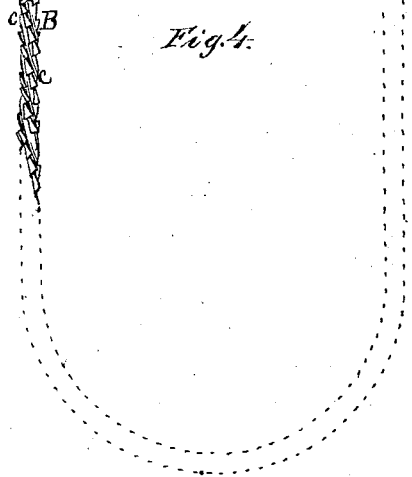
Fig. 4.
Attest:
F. W. Howard
Edwin James.
Inventor:
Milton Chase.
per J. E. F. Holmead
Attorney.

UNITED STATES PATENT OFFICE.

MILTON CHASE, OF HAVERHILL, ASSIGNOR TO HIMSELF, GEORGE S. CHASE, AND HORACE CHASE, OF BOSTON, MASSACHUSETTS.

IMPROVEMENT IN SAWS.

Specification forming part of Letters Patent No. 152,970, dated July 14, 1874; application filed February 21, 1874.

*To all whom it may concern:*

Be it known that I, MILTON CHASE, of Haverhill, in the county of Essex and State of Massachusetts, have invented certain Improvements in Saws, of which the following is a full, clear, and exact description, reference being had to the accompanying drawing and the letters of reference marked thereon, making part of this specification, in which—

Figure 1 is a side view of one formation of saw. Fig. 2 is a side view of another formation of saw. Fig. 3 is a vertical sectional view of Fig. 2. Fig. 4 is a side view of a band-saw with my improvement attached, only part of the teeth being shown.

The object of my invention is the construction of a saw to be used in scroll, jig, or band sawing, that the same may be accomplished with greater ease and facility, as the teeth on the saw are so arranged that it cannot bind or stick in the wood, but will always enable the saw to cut itself free.

The nature of my invention consists in cutting the teeth on all sides of the saw-blade; or in forming the saw-blade with spiral grooves and ridges, the teeth being cut on the ridges; or in first cutting the teeth and then twisting the saw-blade, so that spiral grooves and ridges will be formed, the ridges containing the teeth.

The construction and operation of my invention are as follows: A is the saw, which may be made of a bar of steel, a steel wire, or any other suitable material. All around this bar or blade are cut the teeth B B. These teeth are cut in a zigzag manner, and are so arranged that there shall be a space between each tooth and the one next preceding it. These teeth are also so arranged that those in one row shall be opposite the spaces in the other row.

Another and the preferable mode of constructing my improved saw is accomplished by cutting the teeth on a narrow piece of metal or wire, and then twisting the metal so that the teeth shall surround the saw spirally, leaving grooves or channels $c\ c$ between the rows of teeth, as clearly shown in Figs. 2 and 4. This formation may also be accomplished by cutting spiral grooves in the metal, and then cutting the teeth on the ridges formed by these grooves.

The great advantage of my improved saw is found in the fact that it cannot bind or stick in the wood, as the arrangement of teeth always allows it to cut itself free. With my arrangement, it is intended that the saw shall always be moved vertically, and the wood moved up to the saw; and this I am enabled to do no matter what angles or curves are designed to be cut.

In constructing a band-saw with my improvement attached, the two ends of the bar or blade upon which the teeth are cut are joined by a right-and-left-hand screw-coupling, the ends of the bar being provided with screw-threads for that purpose. This coupling should not be thicker than the diameter of the saw, and may have teeth cut on its surface.

What I claim as new, and desire to secure by Letters Patent of the United States, is—

The saw A, having teeth B B cut on all sides, in the manner specified, said saw-blade being twisted so as to form spiral grooves $c\ c$ and ridges, the latter to contain the teeth, substantially as described.

In testimony whereof I have signed my name to this specification in the presence of two subscribing witnesses.

MILTON CHASE.

Witnesses:
JONES FRANKLE,
EDWD. F. ADAMS.